Figure 1:
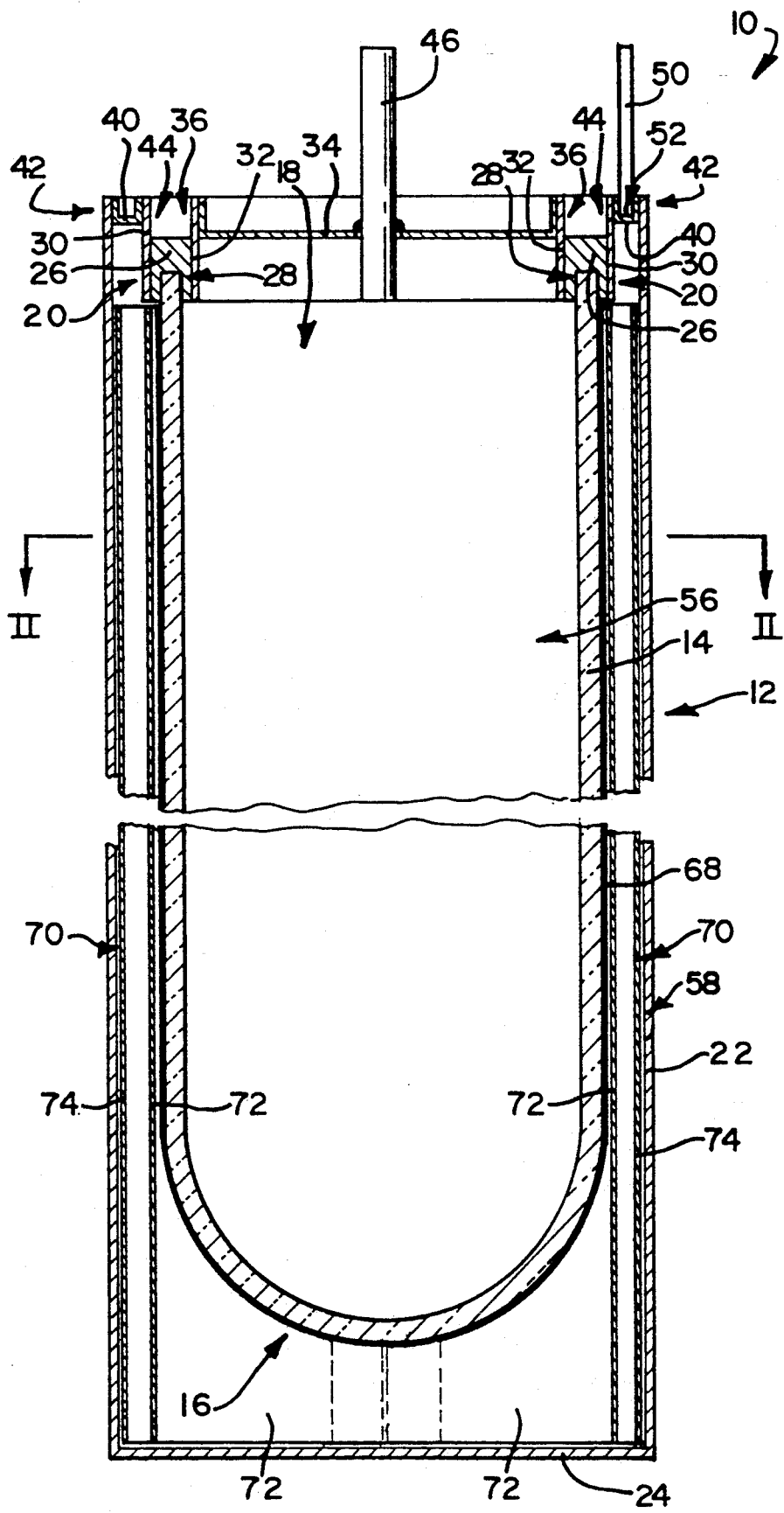

United States Patent [19]
Wright

[11] Patent Number: 5,158,839
[45] Date of Patent: Oct. 27, 1992

[54] ELECTROCHEMICAL CELL

[75] Inventor: Michael L. Wright, Allestree, England

[73] Assignee: Lilliwyte Societe Anonyme, Luxembourg

[21] Appl. No.: 668,271

[22] Filed: Mar. 11, 1991

[30] Foreign Application Priority Data

Mar. 12, 1990 [GB] United Kingdom ............... 9005484

[51] Int. Cl.$^5$ ........................................ H01M 10/39
[52] U.S. Cl. ................................. 429/103; 429/104
[58] Field of Search ............................. 429/103, 104

[56] References Cited

U.S. PATENT DOCUMENTS

| | | |
|---|---|---|
| 4,529,676 | 7/1985 | Galloway et al. |
| 4,546,055 | 10/1985 | Coetzer et al. |
| 4,560,627 | 12/1985 | Bones et al. |
| 4,592,969 | 6/1986 | Coetzer et al. |
| 4,626,483 | 12/1986 | Bones et al. |
| 4,722,875 | 2/1988 | Wright . |
| 4,772,449 | 9/1988 | Bones et al. |
| 4,797,333 | 1/1989 | Coetzer et al. |
| 4,910,105 | 3/1990 | Tilley et al. |
| 4,975,343 | 12/1990 | Coetzer . |

FOREIGN PATENT DOCUMENTS

| | | |
|---|---|---|
| 1491929 | 11/1977 | United Kingdom . |
| 1530273 | 10/1978 | United Kingdom . |
| 2195329A | 9/1987 | United Kingdom . |
| 2213310A | 11/1988 | United Kingdom . |

Primary Examiner—Karl Group
Attorney, Agent, or Firm—Arnold, White & Durkee

[57] ABSTRACT

A high temperature rechargeable electrochemical power storage cell comprises an anode compartment containing a molten alkali metal anode; a cathode compartment containing an alkali metal aluminium halide molten salt electrolyte as well as a cathode which comprises an electronically conductible electrolyte-permeable porous matrix which has dispersed therein an active cathode substance, with the matrix being impregnated with said molten electrolyte; a separator separating the anode compartment from the electrolyte; and a wick in the anode compartment to enhance contact of alkali metal with the separator in the anode compartment. The wick comprises a layer of alkali metal wettable particles on the separator surface, and a metallic anchoring component abutting the wettable particles and protruding into the anode compartment.

16 Claims, 2 Drawing Sheets

ELECTROCHEMICAL CELL

This invention relates to an electrochemical cell. In particular, it relates to a high temperature rechargeable electrochemical power storage cell, to a separator combination for such a cell, and to a method of enhancing alkali metal contact with the separator in such a cell.

According to a first aspect of the invention, there is provided a high temperature rechargeable electrochemical power storage cell comprising (i) an anode compartment containing, at the operating temperature of the cell and when the cell is in its charged state, a molten alkali metal anode; (ii) a cathode compartment containing, at said operating temperature and in said charged state, an alkali metal aluminium halide molten salt electrolyte which is also molten at the operating temperature of the cell, and having the formula MAlHal$_4$, wherein M is the alkali metal of the anode and Hal is a halide, the cathode compartment also containing in said charged state, a cathode which comprises an electronically conductible electrolytepermeable porous matrix which has dispersed therein an active cathode substance THal$_2$ in which Hal is the halide of the electrolyte and T is a transition metal selected from the group of transition metals consisting of Fe, Ni, Co, Cr, Mn and mixtures thereof, the matrix being impregnated with said molten electrolyte; (iii) a separator separating the anode compartment from the electrolyte, the separator comprising a solid conductor of the ions of the alkali metal of the anode or a micromolecular sieve which contains said alkali metal sorbed therein; and (iv) a wick in the anode compartment to enhance contact of alkali metal with the separator in the anode compartment, the wick comprising a layer of alkali metal wettable particles on the separator surface, and a metallic anchoring component abutting the wettable particles and protruding into the anode compartment.

The alkali metal wettable particles promote contact of the alkali metal in the anode compartment with the separator by ensuring efficient transport of alkali metal and electrons to and from the separator surface. The metallic anchoring component augments the wicking capability of the particles and also acts as an anode compartment current collector.

The cell may also include a housing, with the separator located in the housing such that the anode compartment is defined between the housing and the separator. The anchoring component may then span the gap between the housing and the separator so that it is also in contact with the housing.

In a particular embodiment of the invention, the housing or casing may be of tubular form, and may be of metal so that it constitutes the primary anode current collector with the separator also being of tubular form, and with the anchoring component extending between the separator and the casing and being in electrical contact with both so that it is a secondary current collector for the anode compartment.

It will be appreciated that the anchoring component will be such that movement of alkali metal within the anode compartment is still possible. The anchoring component may comprise a plurality of anchoring members located adjacent each other in the annular space between the separator and the tubular casing and spanning the gap from the separator to the casing, with the anchoring members being shaped to permit sodium movement in the anode compartment and adjacent anchoring members abutting each other so as to be in electrical contact with each other. The anchoring members can extend the full length of the anode compartment.

Each anchoring member may comprise an arcuate shaped primary portion abutting the separator, secondary portions extending from the primary portion, e.g. along its longitudinally extending edges, to the casing, and tertiary portions abutting the casing. Each anchoring member may thus comprise a metal sheet or foil suitably shaped, e.g. bent, into the primary, secondary and tertiary portions.

The metal of the anchoring component will be selected such that it is chemically and electrochemically inert in the anode environment while being electrically conductive. The anchoring members can hence be of steel sheets or foil.

In particular, the anchoring members may be such that they act as spring clips with the primary and tertiary portions thus being biassed against the separator and casing respectively. This ensures that they make good electrical contact with the separator and casing, with sodium wetting the surfaces of the foil, separator and casing which are in contact with each other. The members or clips hence ensure that the anode compartment functions efficiently. Only a small quantity of alkali metal is retained in the anode compartment at full discharge, while still ensuring good electrical contact and wettability of the separator surface with alkali metal, at full discharge.

The members or clips also anchor the separator tube against vibration, and will also serve to prevent rapid mixing of the electrolyte and the alkali metal in the event of the separator tube cracking.

The cell may thus be of a type wherein the alkali metal M is sodium; the separator is nasicon, β-alumina or β"-alumina which are known as conductors of sodium ions; and Hal is chlorine, so that the electrolyte is NaAlCl$_4$, the cell thus having as its cell reaction:

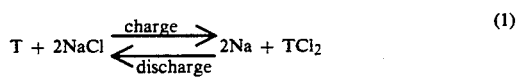

$$T + 2NaCl \underset{\text{discharge}}{\overset{\text{charge}}{\rightleftarrows}} 2Na + TCl_2 \qquad (1)$$

wherein T may be Ni, Fe or mixtures thereof.

The sodium wettable particles may be electrochemically conducting so that they need not be primed with sodium. The diameters of the particles should also be as small as possible since this enhances their wicking capability.

The particles may be fixed to the separator. The particles may thus be embedded in a glass layer bonded to the separator. The glass layer may be composed of a water soluble glass, as sodium silicate, sodium polyphosphate, boric acid or the like. Sodium polyphosphate is, however, preferred in view of its high degree of water solubility which enhances its bonding to the separator, and its relatively low dehydration temperature, which promotes the formation of a uniform and even layer or coat of the glass on the separator.

The particles can hence be fixed to the separator surface by dissolving the water soluble glass in water, admixing the particles with the glass/water solution so that the particles are suspended therein, coating the tube with the resultant composition, and drying the coat to form the glass layer or coat on the separator surface. The proportion of particles to glass is not critical, provided that there is sufficient glass to give adequate adhesion to the separator, and sufficient particles to give adequate conductivity. The coating of the tube with the composition can be effected by any suitable means, e.g. applying it by brush to the separator.

The particles may be metal or carbon particles, but carbon particles are preferred in view of their mass and cost advantage over metal particles. The particulate carbon may be in the form of carbon powder, such as graphite powder or 'lamp black', which is a form of carbon black. Both these carbon powders have the desired degrees of fineness for smooth application to the separator and adherence thereto. Lamp black is, however, preferred in view of its ease of application, good adherence properties and smooth coat finish. Carbon blacks generally have particle sizes in the nonometer range, and it is felt that a lamp black having an average particle size of 50 nonometers, will have good wicking ability when wetted with sodium.

Initially, the cell may contain some sodium in the anode compartment. However, in one embodiment of the invention, no sodium may initially be present in the anode compartment. However, some aluminium and/or zinc will then initially be loaded into the cathode compartment, to form a cell precursor or a cell in overdischarged state. On subjecting the cell precursor to an initial charging, the aluminium and/or zinc will then react with NaCl in the cathode compartment to produce further molten salt electrolyte $NaAlCl_4$ and to form sodium which then passes through the separator into the anode compartment. Sufficient aluminium and/or zinc will then be provided so that the initial reaction with the aluminium and/or zinc on charging provides the initial upstarting amount of sodium in the anode compartment, as described in published British Patent Application No. 2191332A which is hence incorporated herein by reference. This sodium is then sufficient to wet the carbon particles of the wick.

Published British Patent Application No. 2191332A also describes other features and refinements of the cell according to the invention, such as the proportion of alkali metal ions and aluminium ions in the electrolyte having to be such that the solubility of the active cathode substance in the molten electrolyte is at or near its minimum, the use of $Co/CoCl_2$ or $Ni/NiCl_2$ as a cathode substance in parallel with a $Fe/FeCl_2$ cathode, to protect the $Fe/FeCl_2$ from overcharging, in cases where the cell of the present invention has an $Fe/FeCl_2$ cathode; the use of fluoride anions as a dopant in the $NaAlCl_4$ electrolyte to resist progressive internal resistance rise associated with sustained cycling and believed to arise from poisoning of $\beta$-alumina separators by $AlCl_3$ in the electrolyte; the use of chalcogens such as S or Se dopants in the liquid electrolyte and/or active cathode substance to resist progressive reduction in cathode capacity with sustained cycling in $Ni/NiCl_2$ cathodes, etc.

According to a second aspect of the invention, there is provided a separator combination for an electrochemical cell comprising (i) an anode compartment containing, at the operating temperature of the cell and when the cell is in its charged state, a molten alkali metal anode; (ii) a cathode compartment containing, at said operating temperature and in said charged state, an alkali metal aluminium halide molten salt electrolyte which is also molten at the operating temperature of the cell, and having the formula $MAlHal_4$, wherein M is the alkali metal of the anode and Hal is a halide, the cathode compartment also containing in said charged state, a cathode which comprises an electronically conductible electrolyte-permeable porous matrix which has dispersed therein an active cathode substance $THal_2$ in which Hal is the halide of the electrolyte and T is a transition metal selected from the group of transition metals consisting of Fe, Ni, Co, Cr, Mn and mixtures thereof, the matrix being impregnated with said molten electrolyte; (iii) a separator separating the anode compartment from the electrolyte, the separator comprising a solid conductor of the ions of the alkali metal of the anode or a micromolecular sieve which contains said alkali metal sorbed therein, the separator combination comprising a separator comprising a solid conductor of the ions of the alkali metal of the anode of the electrochemical cell in which the separator combination is to be used, or a micromolecular sieve which contains the alkali metal sorbed therein; and a layer of particles, wettable by the alkali metal, on that surface of the separator which will be directed into the anode compartment.

The particles may, as hereinbefore described, be embedded in a glass layer bonded to the separator, the particles may be carbon powder particles, and the glass may be composed of water soluble glass.

According to a third aspect of the invention, in a high temperature rechargeable electrochemical cell comprising an anode compartment containing, at the operating temperature of the cell and when the cell is in its charged state, a molten alkali metal anode, and a cathode compartment containing, at said operating temperature and in said charged state, an alkali metal aluminium halide molten salt electrolyte which is also molten at the operating temperature of the cell, and having the formula $MAlHal_4$, wherein M is the alkali metal of the anode and Hal is a halide, the cathode compartment also containing, in said charged state, a cathode which comprises an electronically conductive electrolyte-permeable porous matrix which has dispersed therein an active substance $THal_2$ in which Hal is the halide of the electrolyte and T is a transition metal selected from the group of transition metals consisting of Fe, Ni, Co, Cr, Mn and mixtures thereof, the matrix being impregnated with said molten electrolyte, and, separating the anode compartment from the electrolyte, a separator which comprises a solid conductor of the ions of the alkali metal of the anode or a micromolecular sieve which contains said alkali metal sorbed therein, a method of enhancing alkali metal contact with the separator in the anode compartment, which comprises applying a layer of particles which are wettable by the alkali metal, to said surface of the separator.

The application of the layer of particles to the separator surface may, as hereinbefore described, be effected by admixing the particles in a glass solution, coating the separator with the mixture, and drying the coat to form a glass layer, in which the particles are embedded, on the separator. The application of the admixture to the separator may be by brushing it onto the separator.

The invention will now be described, by way of example, with reference to the accompanying drawings.

Figure 2:
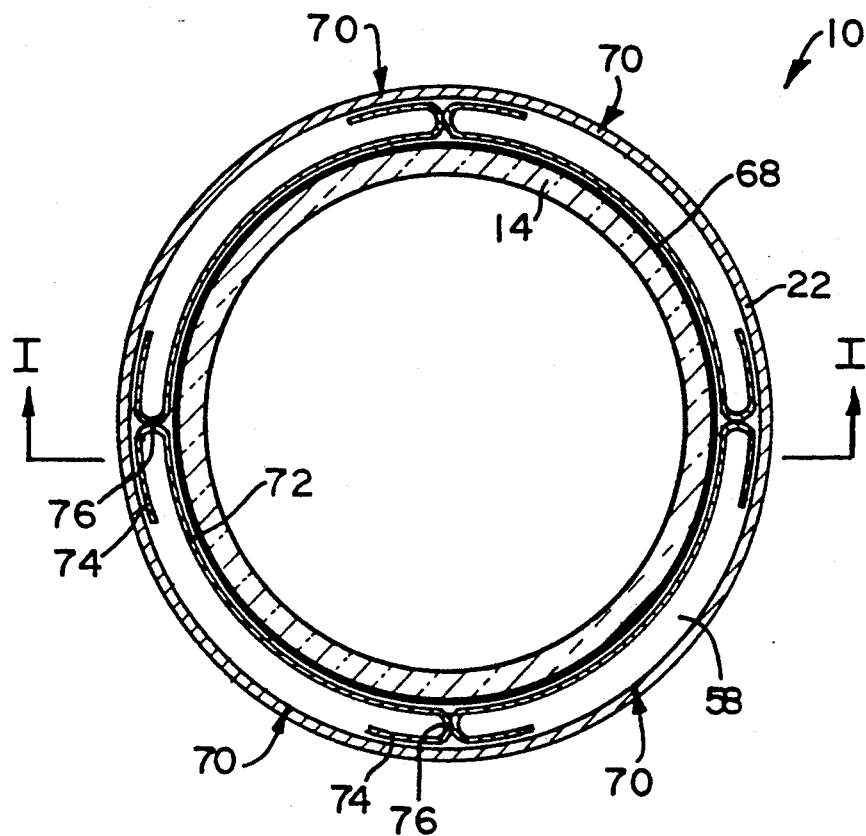

In the drawings,

FIG. 1 shows a schematic sectional side elevation through I—I in FIG. 2, of an electrochemical cell in accordance with one embodiment of the present invention; and FIG. 2 shows a sectional view through II—II in FIG. 1.

In the drawings, reference numeral 10 generally indicates an electrochemical cell in accordance with the invention.

The cell 10 includes an outer cylindrical casing 12 having a side wall 22 connected to a circular floor 24; a beta-alumina tube 14 located concentrically within the casing 12, the tube 14 being closed at its one end 16 and open at its other end 18; and a collar assembly 20 around the end 18 of the tube 14. The collar assembly 20 comprises a circular insulating ring 26 of alpha-alumina, with the end 18 of the tube 14 mounted to the ring 26 by being sealingly located in an annular groove 28 in the ring. Two concentric truncated cylinders of nickel, designated 30, 32, are bonded fluid tightly to the outer and inner curved surfaces respectively of the ring 26. An annular closure disc 34 closes off the open end 18 of the tube 14, the disc 34 being secured to the truncated cylinder or ring 32 at 36. An annular disc 40 also closes off the end of the casing 12 remote from the floor 24, the disc 40 being secured, eg welded, to the casing at 42 and to the ring 30 at 44. A steel rod current collector 46 projects into the tube 14, and a steel rod current collector 50 protrudes from the disc 40 at 52.

A cathode compartment 56 is hence provided inside the tube 14, with an anode compartment 58 being provided around the outside of the tube 14, within the casing 12, the beta-alumina tube 14 hence constituting a separator between the anode and cathode compartments.

The side of the tubular separator 14 which is directed into the anode compartment 58, is provided with a coating or layer 68. The coating or layer is composed of lamp black particles embedded in a sodium polyphosphate glass layer adhering to the separator so that the carbon particles are hence located against or on the separator surface. The layer 68 can be applied to the separator by dissolving 40 parts by mass sodium hexametaphosphate, available from BDH Limited, in 100 parts by mass water. A few drops of acetone to assist in wetting of the carbon black particles are added to the solution. Sufficient lamp black, ie a carbon black having an average particle size of about 50 nonometers, is added to the solution until it has a consistency suitable for painting. The mass proportion of sodium hexametaphosphate to carbon black is not critical, and typically is about 1:1. Sufficient glass should be present to give adequate adhesion of the layer to the separator, while sufficient lamp black should be present to give adequate conductivity. The 'paint' is applied by brush to the tube 14, and it is then dried in air at 275° C. for two hours prior to use.

In other embodiments of the invention, however, other varieties of carbon black, which are commonly used in paints and inks, as well as other varieties of sodium polyphosphate, can be used. It is believed that the sodium polyphosphate, which is ionically conducting, assists in passage of sodium through the layer 68.

The cell 10 also includes four anchoring members 70 located adjacent each other in the anode compartment 58. Each anchoring member 70 is formed, e.g. bent, from a foil or sheet of steel, and is in the form of a spring clip having an arcuate portion 72 bearing against the separator 14, arcuate portions 74 bearing against the casing 22, and connecting portions 76 extending between the portions 72, 74 with the clips being such that the portions 72, 74 are biassed away from each other, thereby to ensure that they are biassed into good electrical contact with the casing 22 and separator 14 respectively. In the drawings, gaps are shown between the components 14, 68 and 72 and the components 72, 22 for ease of illustration but in practice these will naturally abut against each other for good contact as hereinbefore described. The members or clips 70, apart from acting as secondary current collectors in the anode compartment, augment the wicking capability of the layer 68. They also serve to anchor the separator 14 in position relative to the casing 22.

Into the cathode compartment 56 there is placed an electrolyte permeable matrix of Fe, with sodium chloride incorporated therein in dispersed form. Sufficient molten $NaAlCl_4$ electrolyte is then added to the cathode compartment so that the matrix is impregnated with the electrolyte and the electrolyte wets the separator or tube 14. The beta-alumina tube 14 hence forms a continuous barrier between the electrolyte containing cathode compartment 56 and the anode compartment 58, within the housing 12. Initially, the layer 68 and anchoring members 70 provide the required electrical contact between the casing 12 and the separator 16. However, on the first sodium passing through the separator it 'wicks' along the layer 68 and forms an interface between the layer 68 and the members 70, thereby providing further electrical contact between the casing 12 and the separator.

On charging the cell 10, the following reactions take place in the cathode compartment:

$$2NaCl + Fe \rightarrow 2Na + FeCl_2 \qquad (2)$$

The Na generated by reaction (2) passes through the beta-alumina into the anode compartment 58.

Tests on cells 10 have revealed no spalling of the layer 68 after 60 cycles.

I claim:

1. A high temperature rechargeable electrochemical power storage cell comprising (i) an anode compartment containing, at the operating temperature of the cell and when the cell is in its charged state, a molten alkali metal anode; (ii) a cathode compartment containing, at said operating temperature and in said charged state, an alkali metal aluminum halide molten salt electrolyte which is also molten at the operating temperature of the cell, and having the formula $MAlHal_4$, wherein M is the alkali metal of the anode and Hal is a halide, the cathode compartment also containing in said charged state, a cathode which comprises an electronically conductible electrolyte-permeable porous matrix which has dispersed therein an active cathode substance $THal_2$ in which Hal is the halide of the electrolyte and T is a transition metal selected from the group of transition metals consisting of Fe, Ni, CO, Cr, Mn and mixtures thereof, the matrix being impregnated with said molten electrolyte; (iii) a separator separating the anode compartment from the electrolyte, the separator comprising a solid conductor of the ions of the alkali metal of the anode or a micromolecular sieve which contains said alkali metal sorbed therein with the separator located in the housing such that the anode compartment is defined between the housing and the separator; and (iv) a wick in the anode compartment to enhance contact of alkali metal with the separator in the anode compartment, the wick comprising a layer of alkali metal wettable particles on the separator surface, and a metallic anchoring component abutting the wettable particles and protruding into the anode compartment, with the anchoring component spanning the gap between the housing and separator so that it is also in contact with the housing.

2. A cell according to claim 1, wherein the housing or casing is of tubular form and is of metal so that it constitutes the primary anode current collector with the separator also being of tubular form, and with the anchoring component extending between the separator and the casing and being in electrical contact with both so that the anchoring component is a secondary current collector for the anode compartment.

3. A cell according to claim 2, wherein the anchoring component comprises a plurality of anchoring members located adjacent each other in the annular space between the separator and the tubular casing and spanning the gap from the separator to the casing, with the anchoring members being shaped to permit sodium movement in the anode compartment and adjacent anchoring members abutting each other so as to be in electrical contact with each other.

4. A cell according to claim 3, wherein each anchoring member comprises an arcuate shaped primary portion abutting the separator, secondary portions extending from the primary portion to the casing, and tertiary portions abutting the casing.

5. A cell according to claim 4, wherein each anchoring member comprises a metal sheet or foil suitably shaped into the primary, secondary and tertiary portions.

6. A cell according to claim 5, wherein the anchoring members are of steel, and are such that they act as spring clips with the primary and tertiary portions thus being biassed against the separator and casing respectively, to ensure that they make good electrical contact with the separator and casing, and with sodium wetting the surfaces of the foil, separator and casing which are in contact with each other.

7. A cell according to claim 1, wherein the alkali metal M is sodium; the separator is nasicon, $\beta$-alumina or $\beta''$-alumina which are known as conductors of sodium ions; and Hal is chlorine, so that the electrolyte is NaAlCl$_4$, the cell thus having as its cell reaction:

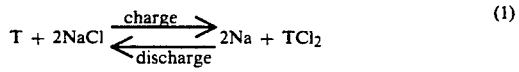

(1)

wherein T is Ni, Fe or mixtures thereof.

8. A cell according to claim 7, wherein the sodium wettable particles are electrochemically conducting so that they need not be primed with sodium, and are fixed to the separator.

9. A cell according to claim 8, wherein the particles are embedded in a glass layer bonded to the separator.

10. A cell according to claim 9, wherein the glass layer is composed of a water soluble glass.

11. A cell according to claim 10, wherein the water soluble glass is sodium polyphosphate.

12. A cell according to claim 8, wherein the particles are carbon powder particles.

13. A separator combination for an electrochemical cell comprising (i) an anode compartment containing, at the operating temperature of the cell and when the cell is in its charged state, a molten alkali metal anode; (ii) a cathode compartment containing, at said operating temperature and in said charged state, an alkali metal aluminum halide molten salt electrolyte which is also molten at the operating temperature of the cell, and having the formula MAlHal$_4$, wherein M is the alkali metal of the anode and Hal is a halide, the cathode compartment also containing in said charged state, a cathode which comprises an electronically conductible electrolyte-permeable porous matrix which has dispersed therein an active cathode substance THal$_2$ in which Hal is the halide of the electrolyte and T is a transition metal selected from the group of transition metals consisting of Fe, Ni, Co, Cr, Mn and mixtures thereof, the matrix being impregnated with said molten electrolyte; (iii) a separator separating the anode compartment from the electrolyte, the separator comprising a solid conductor of the ions of the alkali metal of the anode or a micromolecular sieve which contains said alkali metal sorbed therein, the separator combination comprising a separator comprising a solid conductor of the ions of the alkali metal of the anode of the electrochemical cell in which the separator combination is to be used, or a micromolecular sieve which contains the alkali metal sorbed therein; and a layer of particles, wettable by the alkali metal, on that surface of the separator which will be directed into the anode compartment, with the particles being embedded in a glass layer bonded to the separator.

14. A separator combination according to claim 13, wherein the particles are carbon powder particles, and wherein the glass is composed of water soluble glass.

15. A method of enhancing alkali metal contact with a separator in an anode compartment of a high temperature rechargeable electrochemical cell comprising the anode compartment containing, at the operating temperature of the cell and when the cell is in its charged state, a molten alkali metal anode, and a cathode compartment containing, at said operating temperature and in said charged state, an alkali metal aluminum halide molten salt electrolyte which is also molten at the operating temperature of the cell, and having the formula MAlHal$_4$, wherein M is the alkali metal of the anode and Hal is a halide, the cathode compartment also containing, in said charged state, a cathode which comprises an electronically conductive electrolytepermeable porous matrix which has dispersed therein an active substance THal$_2$ in which Hal is the halide of the electrolyte and T is a transition metal selected from the group of transition metals consisting of Fe, Ni, Co, Cr, Mn and mixtures thereof, the matrix being impregnated with said molten electrolyte, and, separating the anode compartment from the electrolyte, the separator which comprises a solid conductor of the ions of the alkali metal of the anode or a micromolecular sieve which contains said alkali metal sorbed therein, which method comprises applying a layer of particles which are wettable by the alkali metal, to said surface of the separator by admixing the particles in a glass solution, coating the separator with the mixture, and drying the coat to form a glass layer, in which the particles are embedded, on the separator.

16. A method according to claim 15, wherein the particles are carbon powder particles and the glass is water soluble, with the application of the admixture to the separator being by brushing it onto the separator.

* * * * *